US009579982B2

(12) United States Patent
Kato et al.

(10) Patent No.: US 9,579,982 B2
(45) Date of Patent: Feb. 28, 2017

(54) RESONANT MOTOR SYSTEM

(71) Applicant: TBK Co., Ltd., Machida-shi, Tokyo (JP)

(72) Inventors: Yukihiro Kato, Machida (JP); Akihiro Miyoshi, Machida (JP); Mitsuyoshi Oba, Machida (JP)

(73) Assignee: TBK CO., LTD., Tokyo (JP)

( * ) Notice: Subject to any disclaimer, the term of this patent is extended or adjusted under 35 U.S.C. 154(b) by 37 days.

(21) Appl. No.: 14/417,748

(22) PCT Filed: Apr. 16, 2014

(86) PCT No.: PCT/JP2014/060821
§ 371 (c)(1),
(2) Date: Jan. 27, 2015

(87) PCT Pub. No.: WO2015/159385
PCT Pub. Date: Oct. 22, 2015

(65) Prior Publication Data
US 2016/0137071 A1    May 19, 2016

(51) Int. Cl.
| | |
|---|---|
| *H02P 6/14* | (2016.01) |
| *B60L 11/18* | (2006.01) |
| *B60K 6/485* | (2007.10) |
| *H02P 29/00* | (2016.01) |
| *H02K 11/00* | (2016.01) |

(52) U.S. Cl.
CPC ............. *B60L 11/18* (2013.01); *B60K 6/485* (2013.01); *H02K 11/0094* (2013.01); *H02P 29/00* (2013.01)

(58) Field of Classification Search
CPC ............................ B60L 11/18; H02K 11/0094

USPC ..................................................... 318/400.28
See application file for complete search history.

(56) References Cited

U.S. PATENT DOCUMENTS

| | | |
|---|---|---|
| 3,416,016 A | 12/1968 | Murakami |
| 3,609,424 A | 9/1971 | Murakami |
| 4,982,452 A | 1/1991 | Chaise |
| 5,423,117 A | 6/1995 | Okada et al. |

(Continued)

FOREIGN PATENT DOCUMENTS

| | | |
|---|---|---|
| EP | 1921736 A2 | 5/2008 |
| JP | 50-13827 | 2/1975 |

(Continued)

OTHER PUBLICATIONS

PCT International Search Report in Japanese language for PCT/JP2014/060821, dated Apr. 16, 2014, 8 pgs.

(Continued)

*Primary Examiner* — Erick Glass
(74) *Attorney, Agent, or Firm* — Patterson Thuente Patterson, P.A.

(57) ABSTRACT

A resonant motor system having a resonant circuit that includes magnetic coils and of capacitors, for generating an electric power when the resonant lot is rotated by an engine, a regenerating portion for the resonant motor, a motor driving portion, a motor control portion, and a capacitor portion for storing therein the electric power generated by the resonant motor when the resonant motor is regenerated, the resonant rotor being driven by the electric power stored in the capacitor portion when the engine is assisted by the resonant motor.

2 Claims, 7 Drawing Sheets

(56) References Cited

U.S. PATENT DOCUMENTS

| | | | |
|---|---|---|---|
| 5,485,901 A | 1/1996 | Akima et al. | |
| 5,793,167 A | 8/1998 | Liang et al. | |
| 5,847,478 A | 12/1998 | Usui et al. | |
| 5,988,307 A * | 11/1999 | Yamada | B60K 6/26 180/243 |
| 6,084,413 A | 7/2000 | Mohamed | |
| 6,087,734 A * | 7/2000 | Maeda | B60K 6/40 180/65.21 |
| 6,278,194 B1 | 8/2001 | Nakagawa et al. | |
| 6,286,637 B1 | 9/2001 | Park et al. | |
| 6,777,846 B2 | 8/2004 | Feldner et al. | |
| 7,170,263 B2 | 1/2007 | Yamamoto et al. | |
| 7,459,877 B2 | 12/2008 | Cook | |
| 7,531,974 B2 | 5/2009 | Ohtsuka et al. | |
| 8,689,950 B2 | 4/2014 | Tashiro et al. | |
| 2006/0152882 A1 | 7/2006 | Takeda | |
| 2009/0063008 A1 | 3/2009 | Ishikawa et al. | |
| 2011/0214954 A1 | 9/2011 | Tashiro et al. | |
| 2013/0179055 A1* | 7/2013 | Kato | B60K 6/48 701/113 |
| 2014/0232508 A1 | 8/2014 | Inaba | |
| 2014/0266541 A1 | 9/2014 | Sakamoto | |
| 2014/0371968 A1* | 12/2014 | Sakamoto | B60L 1/006 701/22 |
| 2015/0129376 A1 | 5/2015 | Oba et al. | |

FOREIGN PATENT DOCUMENTS

| | | |
|---|---|---|
| JP | 63-206103 | 8/1988 |
| JP | H 02231975 | 9/1990 |
| JP | 3239200 | 2/1991 |
| JP | 5-72544 | 10/1993 |
| JP | 670207 | 9/1994 |
| JP | 650241994 | 9/1994 |
| JP | 07-222304 | 8/1995 |
| JP | 08308208 | 11/1996 |
| JP | 10-201110 | 7/1998 |
| JP | 10313504 | 11/1998 |
| JP | 1156000 | 2/1999 |
| JP | 11318069 | 11/1999 |
| JP | 2000032798 | 1/2000 |
| JP | 2001028221 | 1/2001 |
| JP | 200154276 | 2/2001 |
| JP | 2002247889 A | 8/2002 |
| JP | 2004048943 | 2/2004 |
| JP | 2004-088951 A | 3/2004 |
| JP | 2005219574 | 8/2005 |
| JP | 2008-125219 A | 5/2008 |
| JP | 2009007998 | 1/2009 |
| JP | 2010-028921 A | 2/2010 |
| JP | 2010151235 | 7/2010 |
| JP | 2011188585 | 9/2011 |
| JP | 201359226 | 3/2013 |

OTHER PUBLICATIONS

Japanese Office Action dated Dec. 28, 2013 for Japanese Application No. 49187/2010 filed Mar. 5, 2010, 3 pages.

Chinese Office Action dated Feb. 1, 2013 for Chinese Application No. 201110033626.9, 2 pages.

International Search Report for International Application No. PCT/JP2013/080801 dated Jan. 28, 2014. English translation not provided.

International Search Report and Written Opinion for International Application No. PCT/JP2014/055277 dated May 27, 2014. English translation not provided.

International Search Report for International Application No. PCT/JP2014/057703 dated Apr. 16, 2014.English translation not provided.

International Search Report for International Application No. PCT/JP2014/07167 dated Oct. 7, 2014, English translation not provided.

Application and File History for U.S. Appl. No. 13/030,569 filed Feb. 18, 2011, inventors Tashiro et al.

Application and File History for U.S. Appl. No. 14/387,994 filed Sep. 25, 2014, inventors Oba et al.

* cited by examiner

RESONANT MOTOR SYSTEM

RELATED APPLICATION

This application is a National Phase entry of PCT Application No. PCT/JP2014/060821, filed Apr. 16, 2014, the disclosure of which is hereby incorporated by reference in its entirety.

FIELD OF THE INVENTION

The present invention relates to a resonant motor system, and more particularly, relates to a resonant motor system mounted on an engine of a commercial car in order to increase a rotary torque of the engine of the car when the car is started.

BACKGROUND ART

The rotary torque of an engine of a commercial car has in recent years been lowered at a low speed of the car because of the approach to reducing fuel consumption by reducing an exhaust gas and using a turbo system. Engine torque is increased when the car is started by adding an assist motor to the engine. FIG. 8 depicts the assist motor wherein a reference numeral 1 annotates a tire of a car, 2 annotates an engine, and 3 annotates the assist motor.

As shown in FIG. 8, the assist motor 3 is positioned in a limited space near the engine 2, so that it is necessary to reduce the assist motor in size. It is effective to increase the rotational speed of the motor more than 25000 rpm in order to make the motor small in size and high in power. However, in the conventional inverter, an output frequency is about 250 Hz and the maximum rotational speed is about 2500 rpm at the switching time. An object of the present invention is to obviate the above defects.

SUMMARY OF THE INVENTION

A resonant motor system according to the present invention comprises a resonant motor having a resonant circuit including magnetic coils and capacitors, for generating an electric power when the resonant motor is rotated by an engine, a regenerating portion for the resonant motor, a motor driving portion, a motor control portion, and a capacitor portion for storing therein the electric power generated by the resonant motor when the resonant motor is regenerated, and is characterized in that the resonant motor is driven by the electric power stored in the capacitor portion in case that the engine is assisted by the resonant motor.

A resonant motor system according to another embodiment of the present invention comprises a resonant motor having a resonant circuit including magnetic coils and capacitors, for generating an electric power when the resonant motor is rotated by an engine, a regenerating portion for the resonant motor, a motor driving portion, a motor control portion, and a capacitor portion for storing therein the electric power generated by the resonant motor when the resonant motor is regenerated, a bidirectional converter having two transistors connected in series with each other, inserted between the capacitor portion and the motor driving portion, and a control portion for the bidirectional converter, and is characterized in that a DC link voltage applied on the motor driving portion from the capacitor portion is increased by conducting the two transistors in opposite directions to each other when the control portion of the bidirectional converter receives an electric voltage stored in the capacitor portion and the DC link voltage, and that the resonant motor is driven by the electric power stored in the capacitor portion in the case that the engine is assisted by the resonant motor.

The resonant motor includes a stator yoke, a plurality of magnetic coils arranged along a peripheral direction of the stator yoke spaced apart from one another so as to form multi-phase connections, each of the magnetic coils having an iron core therein, and a steel rotor surrounding the stator yoke and rotated according to the rotation of the engine, and wherein the magnetic coils of each phase connection are connected with capacitors so as to form the resonance circuit, respectively.

The motor control portion generates pulses for each phase and a regenerating pulse when the motor control portion receives an acceleration signal and an engine rotation signal, and wherein the regenerating portion has two transistors each opened and closed by the regenerating pulse, respectively.

The control portion of the bidirectional converter generates a control pulse for conducting the two transistors in opposite direction to each other when the control portion of the bidirectional converter receives an electric voltage stored in the capacitor portion and the DC link voltage. Embodiments of the present invention will be explained with reference to the drawings.

DETAILED DESCRIPTION OF THE DRAWINGS

Figure 1:
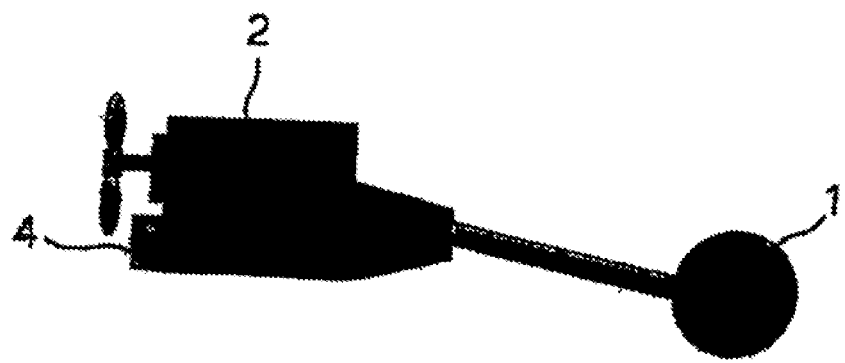
FIG. 1 is a schematic depiction of a resonant motor system in accordance with the present invention.
Figure 2:
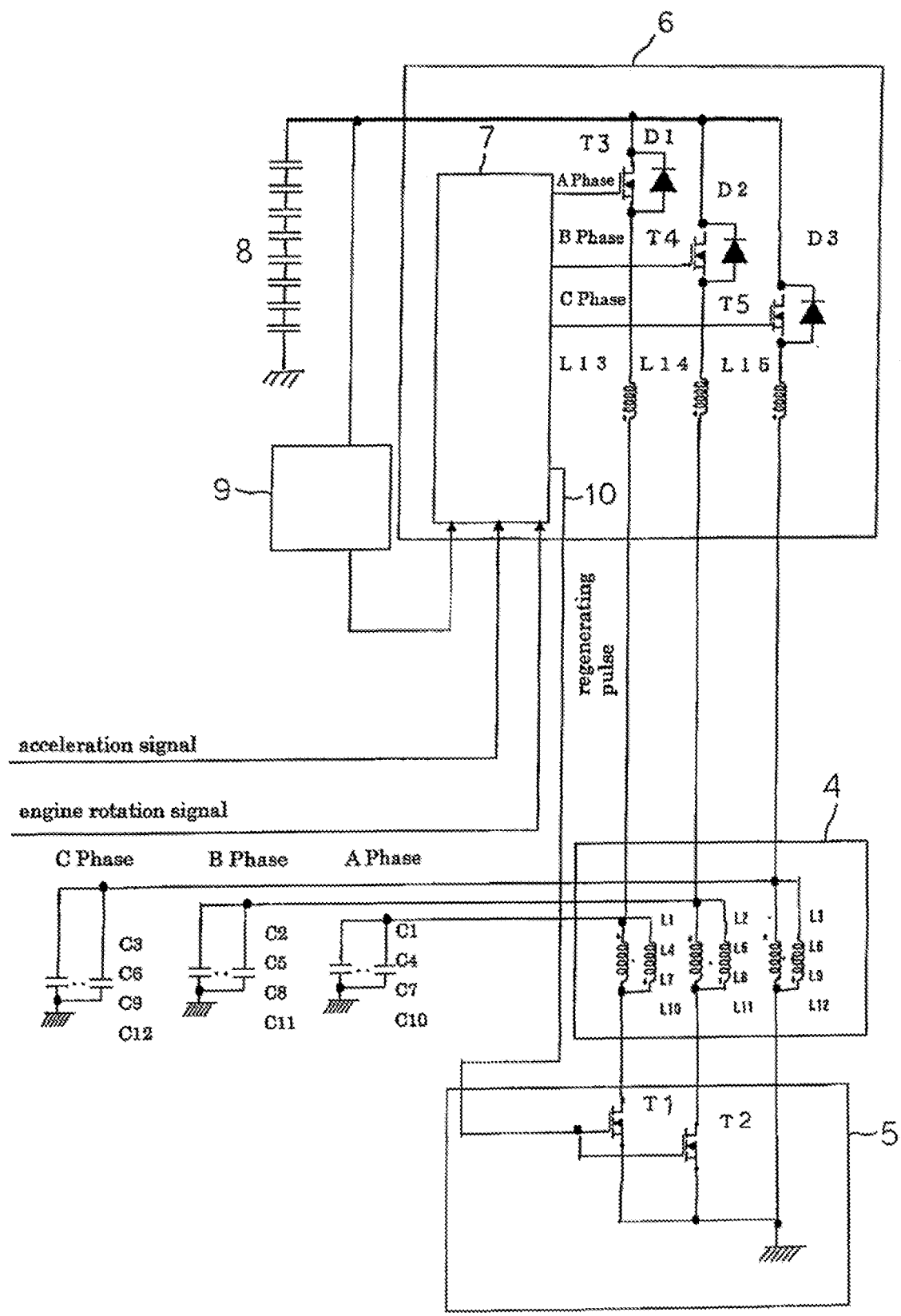
FIG. 2 is a schematic drawing of the resonant motor system in accordance with the present invention.

As depicted in FIG. 1 and FIG. 2, a resonant motor system according to the present invention comprises a resonant motor 4, a regenerating portion 5 having transistors T1 and T2 for the resonant motor 4, a motor driving portion 6, a motor control portion 7 for generating an A phase pulse, a B phase pulse, a C phase pulse and a regenerating pulse when the motor control portion 7 receives an engine rotation signal and an acceleration signal, a capacitor portion 8 consisting of electric double layer capacitors, and a charged voltage detecting portion 9 for the capacitor portion 8.

The motor driving portion 6 includes diodes D1, D2 and D3 for rectifying regenerating currents generated in the regenerating portion 5 when the regenerating portion 5 receives a regenerating pulse 10 from the motor control portion 7, transistors T3, T4 and T5 for connecting the A phase, B phase and C phase connections formed by electromagnetic coils L1 to L12 of the resonant motor 4, and electromagnetic coils L13-L15, and wherein the transistor T3 is connected in series to the A phase connection comprising the electromagnetic coils L1, L4, L7 and L10 through the electromagnetic coils L13 and the capacitor portion 8, the transistor T4 is connected in series to the B phase connection comprising the electromagnetic coils L2, L5, L8 and L11 through the electromagnetic coil L14 and the capacitor portion 8, the transistor T5 is connected in series to the C phase connection comprising the electromagnetic coils L3, L6, L9 and L12 through electromagnetic coils 15 and the capacitor portion 8, and wherein each of the diodes D1 to D3 is connected in parallel to each of the transistors T3 to T5, respectively.

Figure 3:
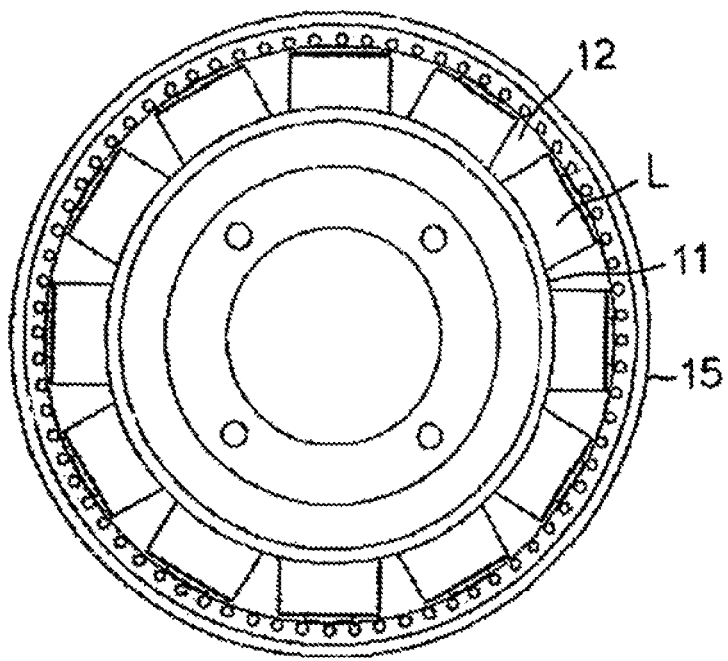
FIG. 3 is a vertically sectional front view of the main portion of the resonant motor according to the present invention.
Figure 4:
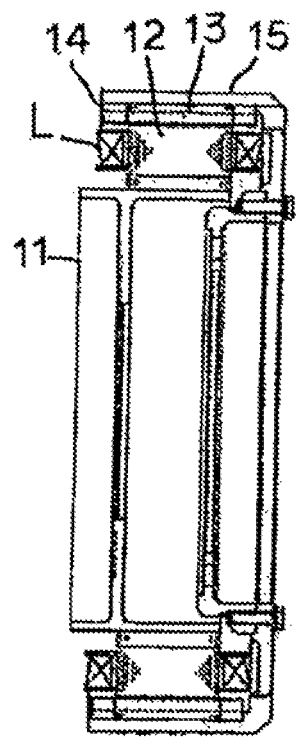
FIG. 4 is a vertically sectional side view of the main portion of the resonant motor according to the present invention.

As shown in FIG. 3 and FIG. 4, a resonant motor 4 according to the present convention includes a stator 11 formed of laminated steel plates (silicon steel plates) a stator yoke 12 formed of laminated steel plates (silicon steel plates), surrounding the stator 11, a magnetic coil L having magnetic coils L1 to L12 arranged along a circle and spaced apart from one another on the stator yoke 12, a steel rotor 15 surrounding the stator yoke 12 and rotated according to the rotation of the engine 2, each of the magnetic coils L1 to L12 having an iron core therein, and a conductive bar 13 and a conductive ring 14 surrounding the stator yoke 12. Capacitors C1 to C12 are connected in parallel to the three-phase connections of the A phase, B phase and C phase, so as to form resonance circuits.

Each of the magnetic coils L1, L2, L3, L7, L8 and L9 is opposite in polarity to each of the magnetic coils L4, L5, L6, L10, L11 and L12. Further, the transistor T1 of the regenerating portion 5 is connected in series to the A phase connection comprising the coils L1, L4, L7 and L10. The transistor T2 of the regenerating portion 5 is connected in series to the B phase connection including the coils L2, L5, L8 and L11.

Figure 5:
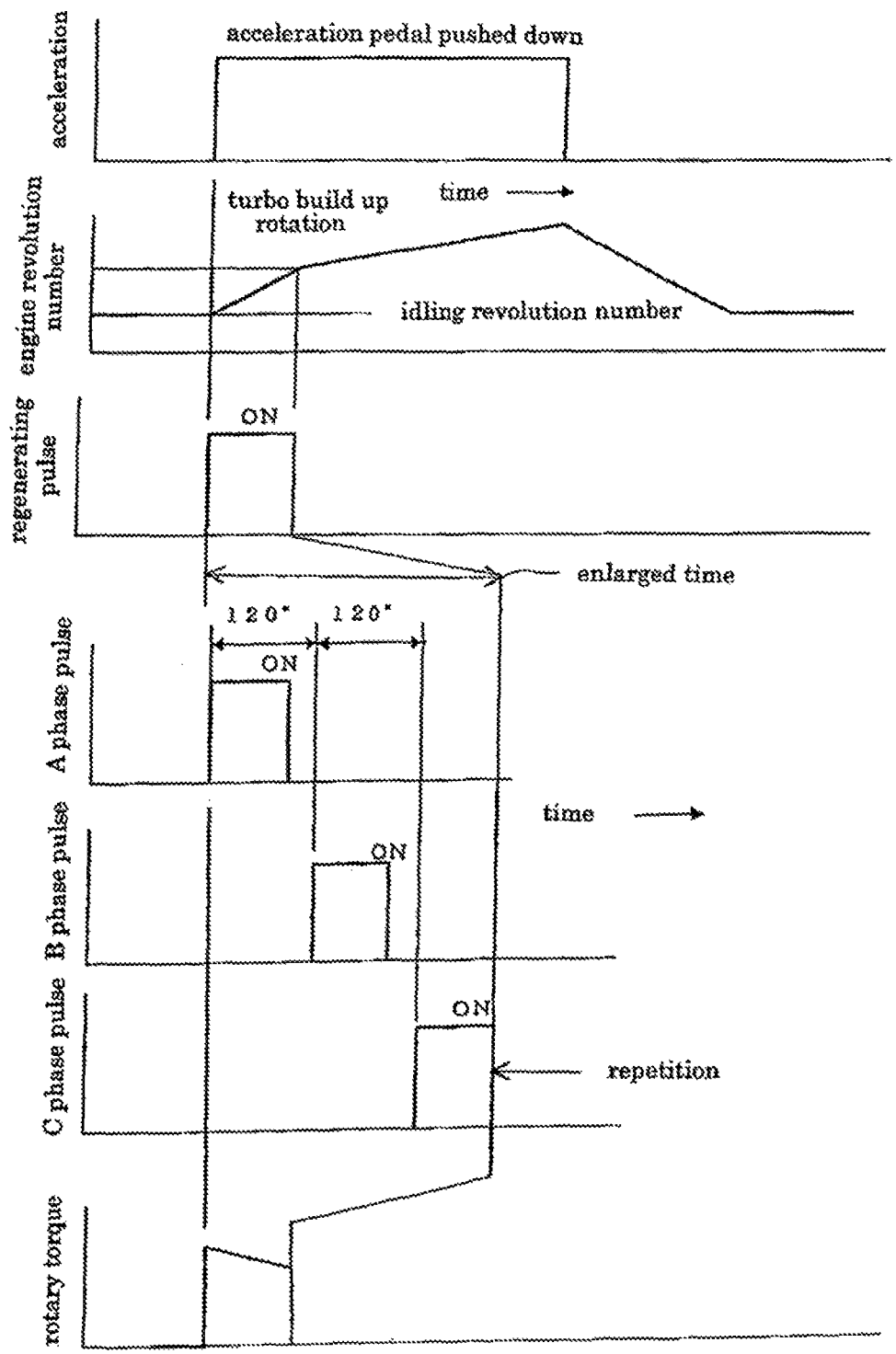
FIG. 5 is a graph depicting the relationship of a step on of an accelerator, a revolution number of the engine, a regenerating pulse, pulses of A phase, B phase and C phase, a rotary torque, a charged voltage, and a time, at the assist operation time of the resonant motor system according to the present invention.

In the resonant motor system of the present invention, as depicted in FIG. 2 and FIG. 5, the regenerating pulse 10 is generated from the motor control portion 7 when an acceleration pedal is pushed down in the assist operation, so that the transistors T1 and T2 of the regenerating portion 5 are turned ON, the resonant circuit of the capacitors and the coils is formed, pulses of three-phases of A to C phases are generated from the motor control portion 7, the pulse currents of three-phases are passed through the coils L13, L14 and L5, respectively, a rotary magnetic field proportionate to the resonant frequency due to the coils and capacitors in the resonant motor is generated, and a rotary torque based on Flaming's rule is generated in the resonant motor 4, and the start up time of the engine rotation is shortened. The generation of the regenerating pulse 10 is stopped, the transistors T1 and T2 are turned OFF, and at the same time, the generation of the pulses of three-phases from the motor control portion 7 is stopped, the three-phase pulse currents from the transistors T3, T4 and T5 are interrupted, and the rotary torque of the resonant motor 4 becomes zero when the engine revolution number becomes larger than a turbo build up revolution number.

Figure 6:
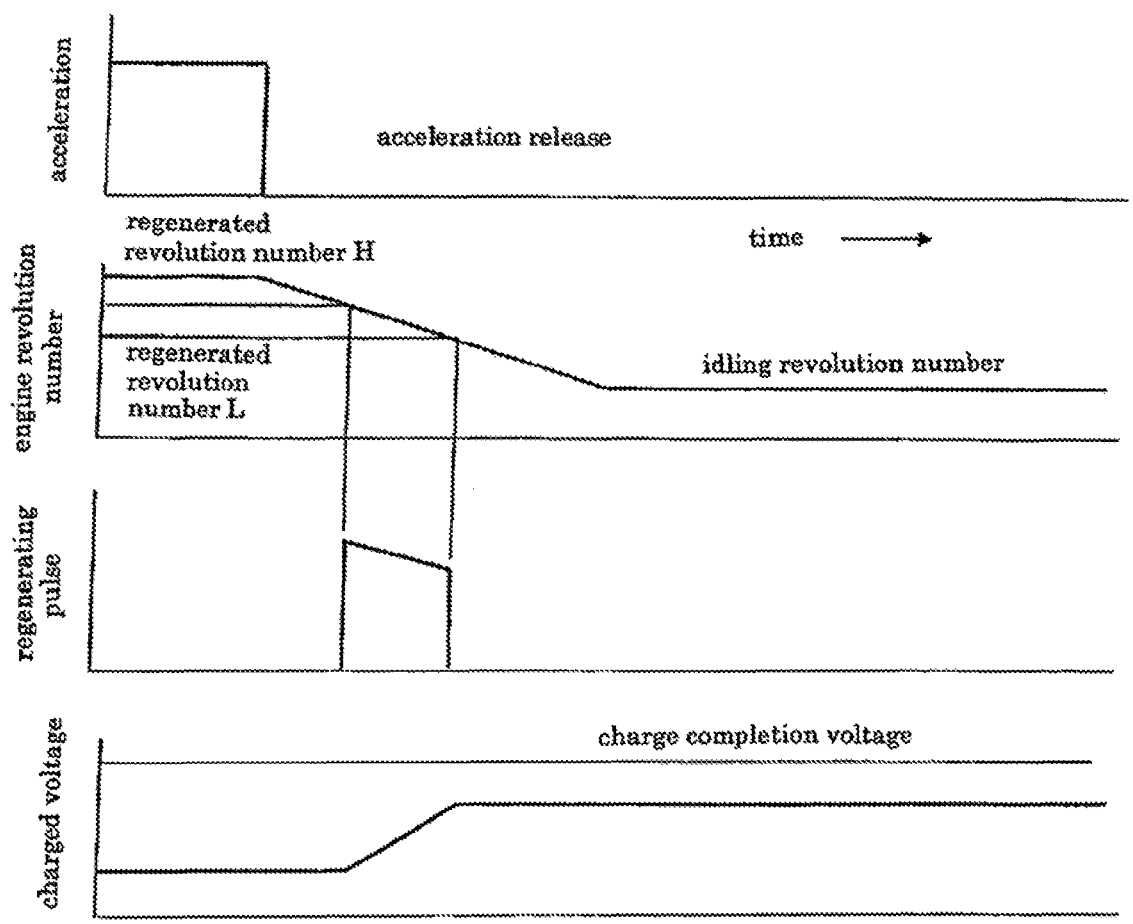
FIG. 6 is a graph depicting the relationship of a step on of an accelerator, a revolution number of the engine, a regenerating pulse, a charged voltage, and a time, at the assist operation time of the resonant motor system according to the present invention.

Due to the operation time of the regeneration, the motor control portion 7 generates the regenerating pulse 10 so as to turn ON the transistors T1 and T2 in the regenerating portion 5, and to form resonance circuits due to the capacitors and the coils, when the motor control portion 7 determines the release of the acceleration, a regenerating revolution number H, and a regenerating revolution number I, as shown in FIG. 6. In the case that the engine revolution number becomes larger than that the rotary magnetic field calculated from the resonant frequency due to the coils and capacitors, a voltage of the electromagnetic coils generated by the residual magnetic fluxes of the steel rotor 15 in the resonant motor 4 is changed to a three-phase AC voltage of a specific frequency. A current is passed through the conductive bar 13 according to the difference between the rotary magnetic field Ns due to the three-phase AC voltage and the revolution number Nr of the steel rotor 15 based on Flaming's rule. The voltage of the electromagnetic coils is increased by the current passing through the conductive bar 13, and is stabilized at a point that the magnetic field is not increased even if the voltage of the magnetic coils is increased. The voltage of the electromagnetic coils is halfwave rectified by the diodes D1, D2 and D3 connected to the coils L13, L14 and L15, respectively, and applied to the electric double layer capacitor portion 8.

Figure 7:
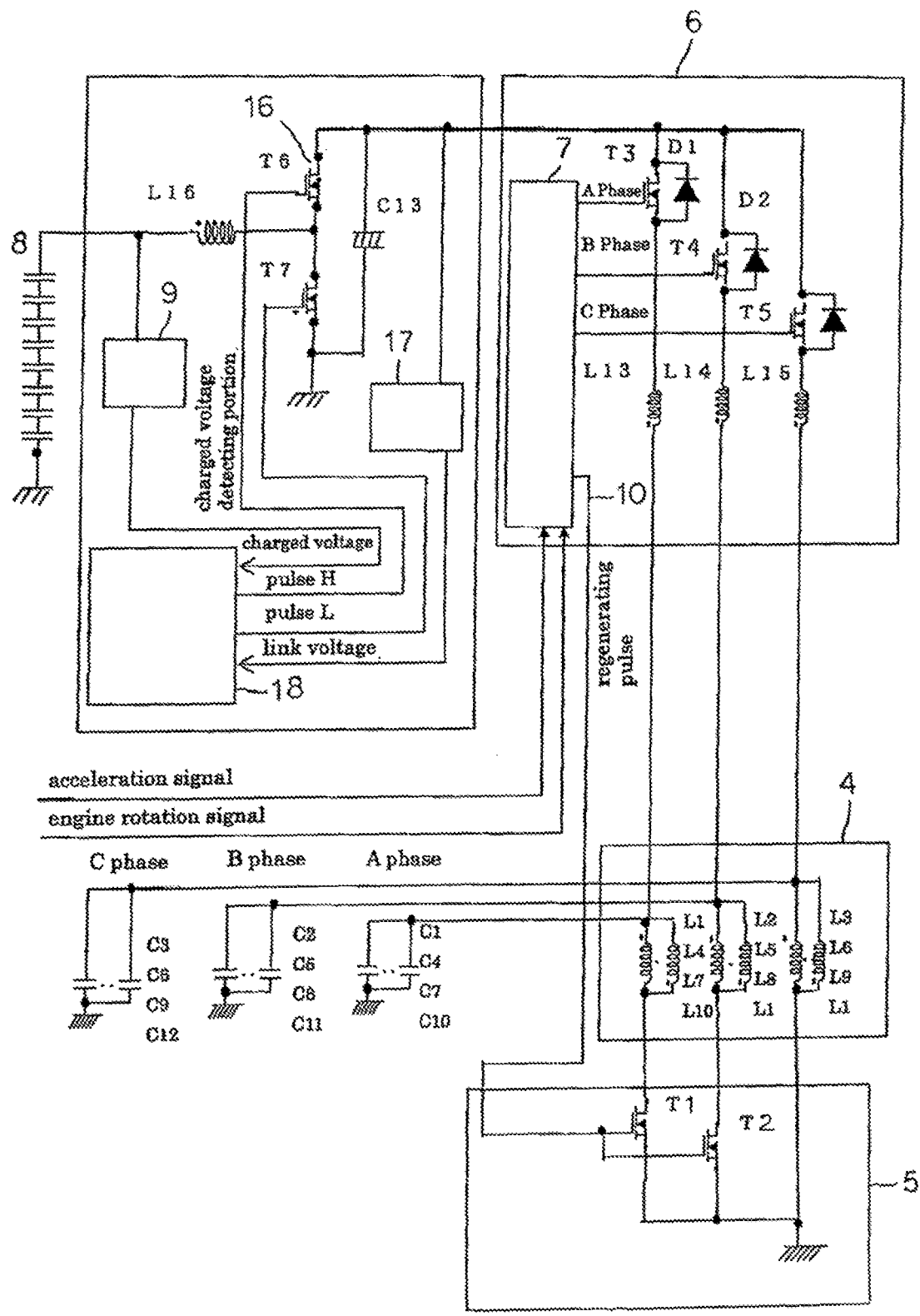
FIG. 7 is a drawing showing a structure of the resonant motor system of the other embodiment according to the present invention.
Figure 8:
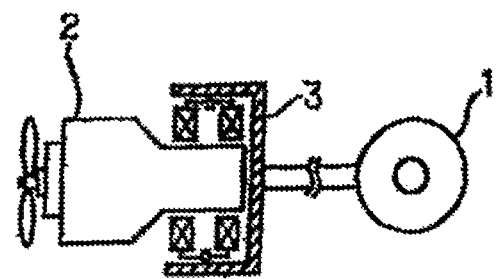
FIG. 8 is an explanation drawing of the conventional assist motor.

In another embodiment of the present invention, as depicted in FIG. 7, a bidirectional converter 16 including a coil L16, and transistors T6 and T7 connected in series to each other, a capacitor C13 connected in parallel to the transistors T6 and T7, and a DC current link voltage detection device 17 for detecting the DC current link voltage applied to the motor driving portion 6 are inserted between the capacitor portion 8 and the transistors T3, T4 and T5 in the motor driving portion 6. Further, a control portion 18 for the bidirectional converter 16 is provided for generating pulses for turning ON or OFF the transistors T6 and T7 of the bidirectional converter 16, so that the transistors T6 and T7 are controlled in opposite directions to each other so as to obtain the DC link voltage of 300V, when the bidirectional converter control portion 18 receives a voltage from the capacitor portion 8 and the DC link voltage. The DC link voltage corresponds to the charging voltage of the capacity portion/a duty ratio of the transistor of the coil side.

In this embodiment, as stated above, the transistors T6 and T7 are so controlled in opposite directions to each other as to obtain the DC link voltage of 300V in the case of the assist operation, and the transistors T6 and T7 are so controlled in opposite direction to each other as to obtain the charging voltage of the capacitor portion 8 of 30V in the case of the regenerating operation.

The charging voltage of the capacitor portion corresponds to the DC link voltage×a duty ratio of the transistors of the coil side.

In accordance with the present invention, the motor driving portion 6 can be driven by the three transistors, because the capacitors C1 to C12 are connected in parallel to the coils L1 to L12, so that the number of the necessary transistors can be reduced in half with respect to the conventional inverter having six transistors. Further, the resonant motor can be rotated more than ten times faster than the conventional inverter, because the switching time of pulse per output frequency in the present invention is only one. The higher harmonic current can be reduced by the resonant phenomenon of the coils and the capacitors, so that a high motor efficiency can be obtained. The supply of the reactive current is not required, because the reactive current is supplied from the capacitors connected in parallel to the coils, so that the current of the motor driving portion can be reduced by 30%, and the transistor can be made small in size, because thin electric wires for connecting the motor driving portion to the coils can be used. The required number of the electric double layer capacitors of the capacitor portion to be connected in series to one another can be reduced to one by ten, by increasing the DC link voltage for the bidirectional converter. A resonant motor, having a high efficiency and being light in weight can be obtained, because thin electric wires can be used for connecting the motor driving portion to the capacitor portion comprising the electric double layer capacitors, even if the motor driving portion is separated from the capacitor portion.

The invention claimed is:

1. A resonant motor system comprising a resonant motor having a resonant circuit including magnetic coils and of capacitors, for generating an electric power when the resonant motor is rotated by an engine, a regenerating portion for the resonant motor, a motor driving portion, a motor control portion, and a capacitor portion for storing therein the electric power generated by the resonant motor when the resonant motor is regenerated, wherein the motor control portion generates pulses for each of a plurality of phases of said electric power and a regenerating pulse when the motor control portion receives an acceleration signal and an engine rotation signal, and wherein the regenerating portion has two transistors each opened and closed by the regenerating pulse, respectively, and a control portion generating a control pulse for conducting the two transistors in opposite directions to each other when the control portion receives an electric voltage charged in the capacitor portion and a DC link voltage applied on the motor driving portion, the resonant motor being driven by the electric power stored in the capacitor portion when the engine is assisted by the resonant motor.

2. A resonant motor system comprising a resonant motor having a resonant circuit including magnetic coils and capacitors, for generating an electric power when the resonant motor is rotated by an engine, a regenerating portion for the resonant motor, a motor driving portion, a motor control portion, a capacitor portion for storing therein the electric power generated by the resonant motor when the resonant motor is regenerated, wherein the motor control portion generates pulses for each of a plurality of phases of said electric power and a regenerating pulse when the motor control portion receives an acceleration signal and an engine rotation signal, the regeneration portion comprising a bidirectional converter having two transistors connected in series with each other, inserted between the capacitor portion and the motor driving portion, and a control portion for the bidirectional converter, the two transistors each opened and closed by the regenerating pulse, respectively, the control portion for the bidirectional converter generating a control pulse for conducting the two transistors in opposite directions to each other when the control portion for the bidirectional converter receives an electric voltage charged in the capacitor portion and a DC link voltage applied on the motor driving portion, the resonant motor being driven by the electric power stored in the capacitor portion when the engine is assisted by the resonant motor.

\* \* \* \* \*